Nov. 21, 1967  G. EMDE  3,353,280
APPARATUS FOR THE VISIBLE AND AUDIBLE PRESENTATION OF
INFORMATION IN A DESIRED SEQUENCE
Filed Feb. 16, 1965  5 Sheets-Sheet 1

INVENTOR
Günter Emde

By McHew and Toren
ATTORNEYS

Nov. 21, 1967   G. EMDE   3,353,280
APPARATUS FOR THE VISIBLE AND AUDIBLE PRESENTATION OF
INFORMATION IN A DESIRED SEQUENCE
Filed Feb. 16, 1965   5 Sheets-Sheet 2

INVENTOR
Günter Emde

By McGlew and Toren
ATTORNEYS

INVENTOR
Günter Emde

By W. Glew and Torex
ATTORNEYS

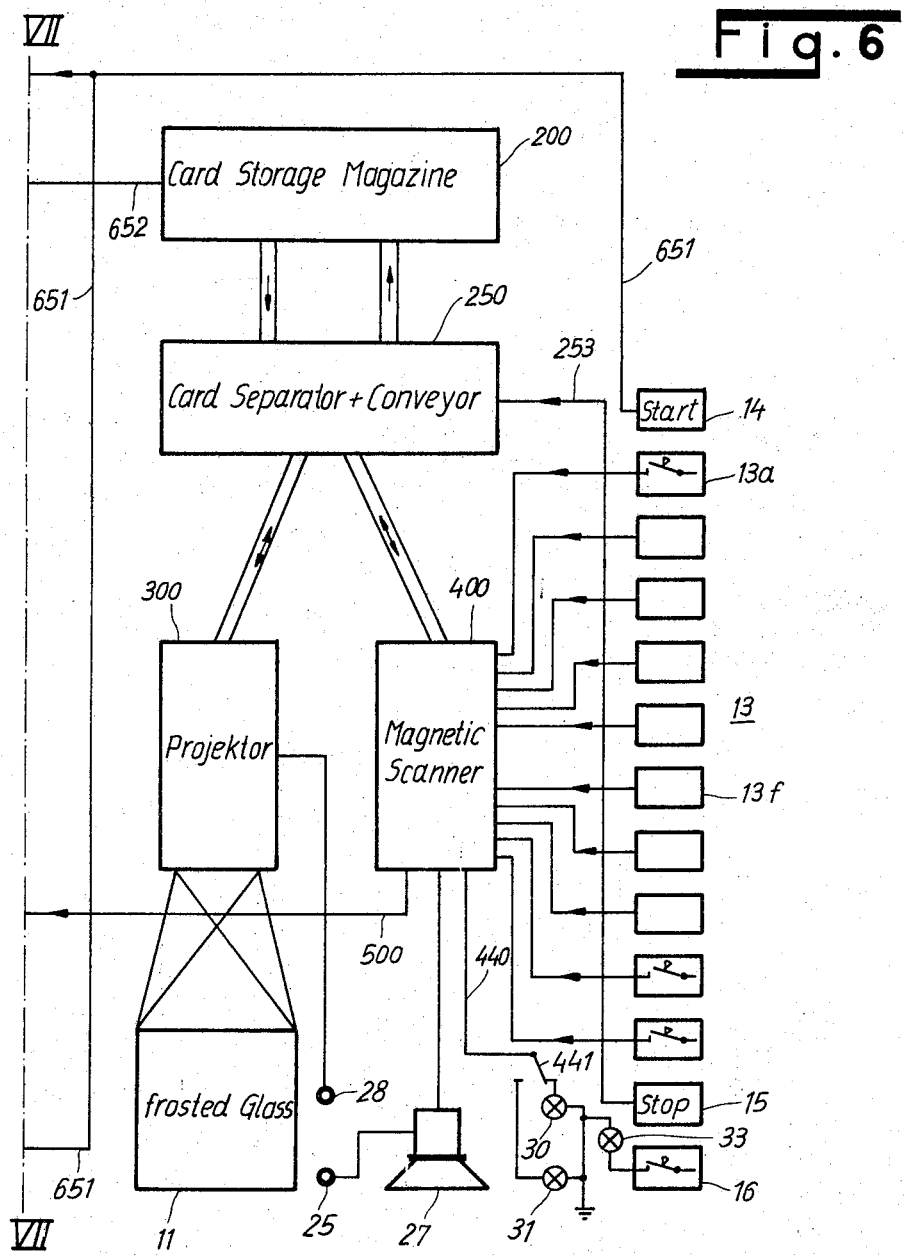

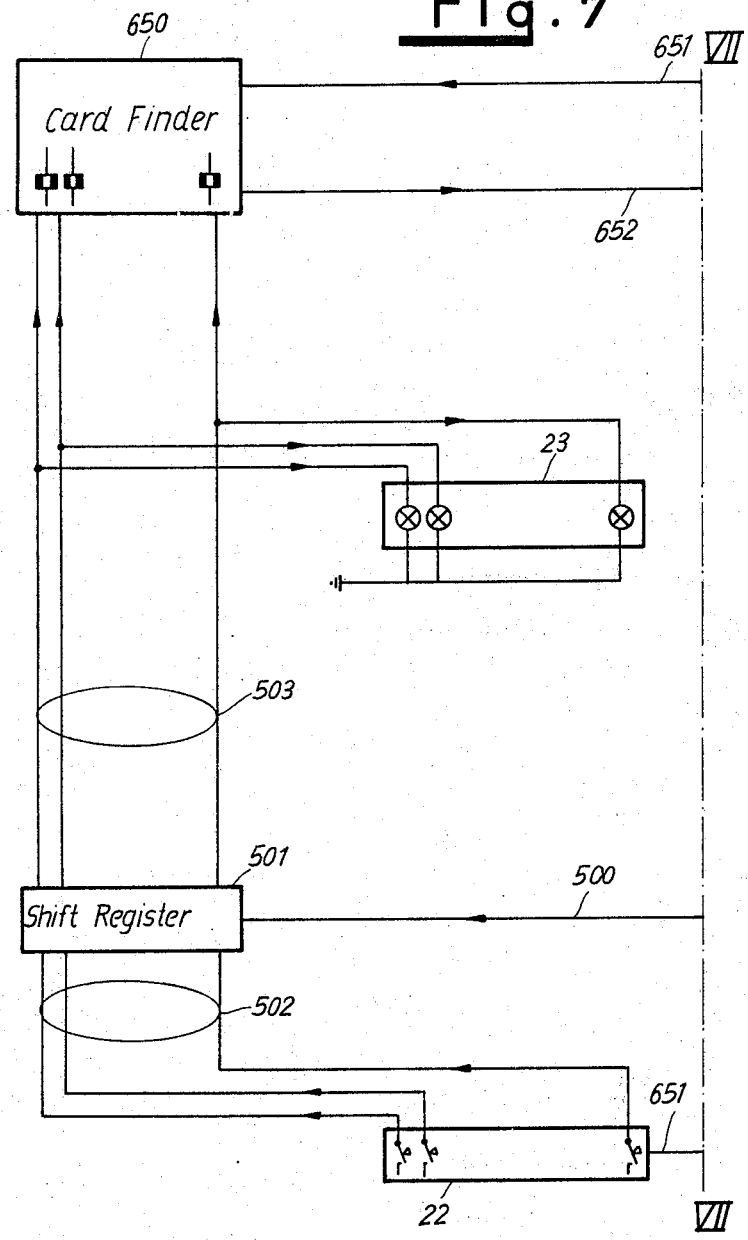

United States Patent Office 3,353,280
Patented Nov. 21, 1967

3,353,280
APPARATUS FOR THE VISIBLE AND AUDIBLE PRESENTATION OF INFORMATION IN A DESIRED SEQUENCE
Günter Emde, Neubiberg, Germany, assignor to Bolkow Gesellschaft mit beschrankter Haftung, Ottobrunn, near Munich, Germany
Filed Feb. 16, 1965, Ser. No. 433,074
Claims priority, application Germany, Mar. 28, 1964, B 76,104
24 Claims. (Cl. 35—9)

ABSTRACT OF THE DISCLOSURE

The disclosure is directed to apparatus for the visible and audible presentation of information, such as a teaching machine or the like. A plurality of separate information units is provided in a card storage magazine, each information unit comprising two cards, one containing audible information and the other containing visible information. The audible information may be in the form of magnetic recordings and the visible information may be in the form of slides or the like.

The facing surfaces of the two cards of each unit are provided with interlocking means whereby the two cards may be relatively displaced laterally to a limited extent. One of the cards is provided with identifying indicia, in the form of tabs separated by slots, along one edge, and a selector means is cooperable with these tabs to select a particular information unit or extraction from the card storage magazine. The extracted cards are then separated and conveyed to a magnetic scanner and to a projector, the magnetic scanner producing the audible information and the projector producing the visible information.

The user is provided with a row of answering keys each of which is adjacent a respective answer. If the user depresses the right answering key, the apparatus is activated to remove the first information unit and to select and position the next succeeding information unit. Control of the next succeeding information unit is provided by a portion of the magnetic sound track on the card used for presentation of audible information.

Background of the invention

This invention relates to methods and apparatus for the visible and audible presentation of information, such as teaching procedures and machines, by means of which information stored on a recording means is presented to a person with the cooperation of the person. More particularly, the present invention is directed to a novel and improved method of and apparatus for selectively visibly and audibly presenting recorded information in any desired sequence.

A known type of teaching machine uses slides as a means for recording and storing information. To present the information, the slides are taken individually from a magazine and transferred to a projector. After various manipulations by the operator of the machine, and particulary after answering the respective questions, the slides are returned either to a storage magazine or to the original magazine.

Keys are provided for answering the respective questions presented, there being one key for each question. Depending upon which key is pressed, and upon scannable information on the slide indicating the correct answer, the next slide is offered if the answer is correct. However, if the answer is incorrect, a new slide is not introduced into the projector until after an area of the projected slide is exposed, this area containing a reference to the correct answer.

In order to present information audibly as well as visibly, a known procedure is to use magnetic recording sheets which contain magnetically scannable information on the back in addition to printed and graphic information on the front. In arrangements of this type, presentation of the information is effected by taking the sheets individually and successively from a magazine and transferring them to a position where the printed and/or graphic information is visible. When the sheets are in this position, they are magnetically scanned for audible as well as visible presentation of the information content. After the questions presented have been answered, the sheets are transferred from the visible position to a storage magazine.

Yet another known procedure is to use tapes as the recording means for the acoustical or audible information. These tapes have, on an additional track, signals controlling the transfer to the next optical display unit.

The greatest disadvantage of these known types of teaching machines is that the succession of the recorded information bits to be presented is fixed, so that only a linear presentation of the stored information is possible. This restriction is very disadvantageous for the presentation of a teaching subject, since it must be assumed that there are gaps in the knowledge of the person being taught, and these frequently can be filled only by information which is secondary to the subject proper being presented.

In order to permit program diversification, such as the division of a subject into main programs and subprograms, for example, film strips are used as the information recording and storage means. On a teaching machine suitable for presenting the information stored on the films, keys are provided for answering the various questions presented within an information content. These keys are so connected with the operating means for the film feed that individual information bits on the film may be presented in different order, so that some of the information bits or pictures can be skipped. The questions to be answered for each information bit are provided with identifying numbers which refer to one or several keys that must be operated in order to cause the film to be advanced.

The disadvantage of this type of arrangement is that the person to be taught is distracted from the subject proper and is confused by the identifying numbers, which latter bear no physical relation to the answers to be selected. Furthermore, if characters of the type of the identifying numbers appear concurrently in the teaching text, a full program diversification would be possible only if the number of keys, or of key combinations, provided were equal to the number of information units carried by a film. This is prohibitive for reasons of economy and for reasons of the desired compactness of the control desk. In particular, the presentation of acoustic or audible information is not possible with these machines, because the provision of means for controlling any tape section at will would make the machine too complicated.

For reasons of compactness of the keyboard and of economy, only a small number of jump widths, permanently wired into the machine, is provided, so that the program can no longer be used in the form of a reference work. In order to re-locate a certain point of the program, it is necessary to pass through all preceding program parts with this type of machine, even though somewhat superficially. Consequently, such machines cannot be used for other than teaching purposes. Furthermore, due to the fixed succession of information units provided by the film, it is hardly possible to correct or to supplement a program, once the latter has been set up.

An object of the present invention is to provide a method for the visible and audible presentation of recorded information and in which the information bits may be presented in any desired sequence or order in accordance with control exerted by the performer of the method.

Another object of the invention is to provide apparatus for the visible and audible presentation of recorded information, and in which the recorded information may be presented in any desired sequence and without requiring operations distracting the operator's attention from the information being presented.

A further object of the invention is to provide apparatus for the visible and audible presentation of recorded information, and including plural separate information units each having respective scannable information recorded thereon, with each unit having respective first scannable features identifying the respective unit and respective second scannable features determining the next information to be presented in dependence on information fed to the apparatus by the operator thereof.

Yet another object of the invention is to provide apparatus for the visible and audible presentation of recorded information, and by means of which the recorded information may be presented in any desired sequence, and including an automatic finder by means of which the information context is selected and conditioned for visible and audible presentation.

Still a further object of the invention is to provide an apparatus for the visible and audible presentation of recorded information, and in which the information may be presented in any desired sequence, with the apparatus presenting the information visually with a series of possible answers positioned next to a series of answering keys, whereby identifying numbers for the keys may be eliminated.

An ancillary object of the foregoing is to provide such an apparatus in which, if a correct answer is selected, a new information unit is presented corresponding to additional recorded information and associated with the respective key, but in which, in case a wrong answer is selected, a recorded information bit is presented to fill the informational gap disclosed by the wrong answer, and likewise associated with the respective operated key.

A further object of the invention is to provide apparatus for the visible and audible presentation of recorded information in which the information is recorded on cards having marginal notches forming scannable features identifying their respective card, and which cards carry the recorded information for projection by a slide projector and for magnetic sound reproducer.

Still another object of the invention is to provide an apparatus of the type just mentioned in which selection of successive cards is effected by scannable information magnetically recorded on each preceding card.

Still a further object of the invention is to provide apparatus for the visible and audible presentation of the recorded information in which the information is recorded on cards and in which the cards may be interchanged or replaced in an easy and simple manner.

Another object of the invention is to provide apparatus for the visible and audible presentation of recorded information in which the information is recorded on units each comprising a pair of cards which are mechanically intercoupled with each other, one of the cards containing information recorded for visual presentation and the other card containing related information recorded for audible presentation.

Apparatus for the visible and audible presentation of information meeting the foregoing objects has particular advantages. It permits program diversification to an extent not possible up to now, and wherein any point in a program of information can be selected and the information presented visibly and audibly. Thereby, permanently wired program steps within the apparatus can be disregarded for the programming of a subject. Hitherto, this has not been able to be effected with known apparatus for the visible and audible presentation of recorded information. Since each card means which in being presented determines the card means to be presented next, in dependence on the information fed to the apparatus by the user, namely by the selection of one of the answers presented, the user can direct his full attention to the subject matter presented and without any distraction.

Each information unit can be changed separately, and it is possible to correct errors, add to the information content, and to replace damaged information carriers without any difficulty. Even whole parts of programs can be deleted or added without having to rearrange the information units not effected by the changes, in contrast, for example, to the case where it is desired to correct information recorded on films. Furthermore, any teaching program can be used as a reference work, since each individual recorded information carrying unit can be controlled directly.

For this reason, the apparatus of the invention is not limited to teaching machines, but can be used for making readily and rapidly available data, surveys, noises, repair lines, operating instructions, and similar information. The apparatus provides for the precise removal of the selected recorded units, which comprise a pair of cards, from a stack thereof and without moving adjoining pairs of cards from their stacked position.

For an understanding of the principles of the invention, reference is made to the following description of a typical embodiment thereof as illustrated in the accompanying drawings.

Figure 1:
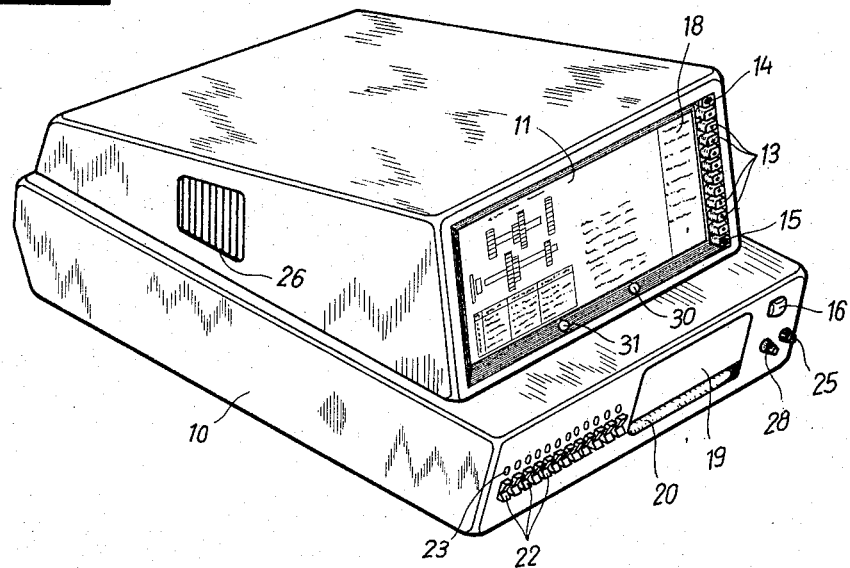
FIG. 1 is a perspective view of apparatus for the visible and audible presentation of information, in accordance with the invention.

FIGS. 6 and 7, taken conjointly along the line VII—VII, constitute a block diagram of the circuitry of the apparatus shown in FIG. 1.

Figure 2:
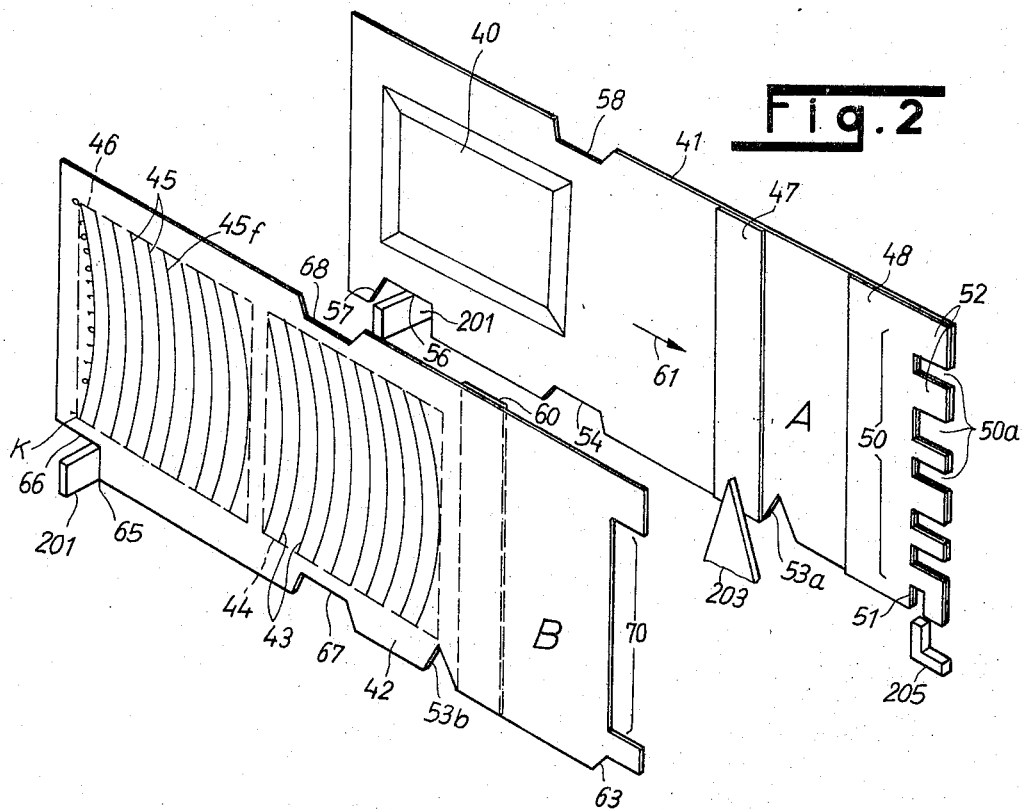
FIG. 2 is a perspective view of a pair of cards forming an information storage unit.
Figure 3:
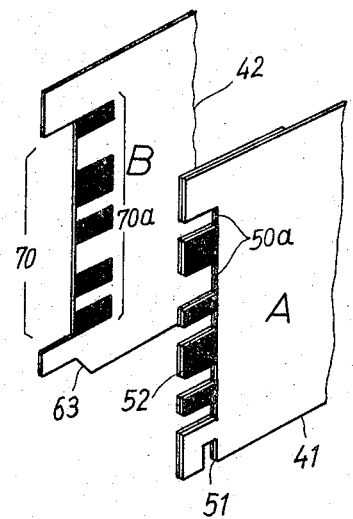
FIG. 3 is a perspective view illustrating a detail of FIG. 2.

Referring to the drawings, in FIG. 1 the invention is illustrated as embodied in a teaching machine 10 including a housing having, on its front side, a translucent frosted panel 11 to display information stored on information units of the type shown in FIGS. 2 and 3. The teaching machine 10 includes a column of answering keys 13 adjacent a shorter side of panel 11 and, in the illustrated example, there are ten of these answering keys. Directly adjacent the answering keys, panel 11 is provided with a sub-panel or section 18 onto which is projected the data stored on a respective recording means and associated with the individual answering keys. Such data may comprise a series of answers from which the right answer must be selected, and each answer is projected laterally adjacent a key 13.

The machine 10 is further provided with a start key 14 and a stop key 15, as well as with a key 16 acting as a main switch to connect and disconnect the machine. An opening 20 is provided in the front side or wall of the machine 10, and is closed by a flap or door 19. This opening 20 is provided for introduction of the information units, containing the information to be offered and answered, into a card storage magazine in the machine 10. As will be described, in the illustrated embodiment of the invention, each information unit comprises a pair of cards.

On the front side of the teaching machine 10 there is also provided a keyboard 22 containing a number of keys, such as twelve keys, which keys serve to set the identifying numbers associated with the respective individual information units. A lamp array 23 is operatively associated with keyboard 22, with there being one lamp associated with each respective key of the keyboard.

A knob 25 on machine 10 is provided to adjust the volume of a loudspeaker 27 arranged behind a sound aperture 26 on the side wall of machine 10, and another knob 28 is provided for adjusting the brightness and/or the sharpness of the information projected onto frosted glass panel 11. Two indicator lamps, 30 and 31, are provided and respectively light up in the case of a "right" answer and in the case of a "wrong" answer. Another lamp 33, which is shown in FIG. 6, is lit when key 16 is pressed, and preferably is mounted within key 16.

As stated, the recording means carrying the information to be presented is in the form of information units each consisting of a card 41, carrying a slide 40, and a card 42 carrying the acoustical information in the form of a magnetic recording. These cards and their selection, are best seen in FIGS. 2, 3, 4 and 5. For ready reference, card 41 will hereinafter be called the "A-card," and card 42 the "B-card." Slide 40 not only contains the information to be presented visually, but also has the answers which are projected in the panel 18 of frosted glass 11, for selection by the user of the machine by pressing a particular key 13.

The associated acoustical information is contained on the B-card in the form of scannable magnetic sound tracks 43 arranged inside a recording panel 44. In addition to the sound tracks 43, the B-card contains ten additional sound tracks 45 arranged inside another recording panel 46, these ten additional tracks corresponding, in the particular embodiment selected for illustration, with the ten answering keys 13. Each track 45 carries the address of a respective information unit which is to be presented as the next information unit, and in dependence upon the answering key pressed in the instant case. For the address, there may be used a binary 6 ex 12-code, or the like. The binary 6 ex 12-code provides a twelve digit address consisting of six 1's and six 0's. Thus, in the present case, a maximum of 924 different addresses can be provided for a teaching program, corresponding to 924 different information units each consisting of a pair of cards.

For a clearer understanding, instead of the word "address" the words "identifying number" will be used hereinafter as meaning the same thing as "address." In advance of each identifying number on each track 45, there is a binary digit "K" which represents the information "right" or wrong," as will be explained hereinafter.

In order to provide for the use of an A-card and a B-card, as a pair, to form one information storage unit, each A-card is provided, on the surface facing the associated B-card, with a follower 47 in the form of a strip of paper or cardboard pasted on to a surface of the card and extending over the entire width or heighth of the card, and the two cards are arranged in surface-to-surface substantial juxtaposition. Each A-card has, in addition, a similar pasted on reinforcement 48 at the shorter edge of the A-card facing the selector 660, shown in FIG. 4 and described hereinafter. This edge is a so-called "notched edge" 50 and is formed, as can be best seen in FIG. 2, with a series of identifying notches 50a corresponding to the "identifying number" of the respective recording unit or means, the identifying notches being substantially equal in depth and separated by tabs 52. At the bottom end of the "notched edge" 50, as viewed in FIG. 2, there is provided an additional notch 51 which opens downwardly and which serves for extraction of a selected pair of cards from a card stack in a manner to be described. Each A-card further has, along its bottom edge, additional notches 53a, 54 and 56, and its top edge has a notch 58.

B-card 42 is provided, on its surface facing A-card 41, with a paper or cardboard strip about as thick as the card, pasted on this surface and forming a follower 60 extending over the entire width or height of the card.

When the A-card and the B-card are juxtaposed, follower 60 engages in the space between reinforcements 47 and 48. Follower 60 is about one-half the width of the space between reinforcements 47 and 48. Thus, when the A-card moves in the direction of the arrow 61, the associated B-card must also move in the direction of arrow 61. Each B-card is further provided with a recess 63, corresponding to the notch 51 of the A-card, with the notch 53b corresponding to the notch 53a of the A-card, with an open ended recess 66, corresponding to the notch 56 of the A-card, and with a notch 67 in its bottom edge and a notch 68 in its top edge.

The notched edge 50 of the A-card is not formed on the B-card. However, the latter is formed, on the shorter edge corresponding to the notched edge 50 of the associated A-card, with a continuous notch 70 equal in length to the series of identifying notches 50a. On its surface facing the A-card, the B-card is provided with a notch pattern 70a corresponding to the notch pattern of the respective A-card, as best seen in FIG. 3. The color of this pattern 70a is repeated on the projections or tabs 52 of notched edge 50 of the A-card. If associated A- and B-cards are combined to form a pair, a continuous color strip thus is formed when the A-card is pushed back, or when its follower 60 bears against the reinforcement 48. By the provision of this coloring, it is easy to check if a pair of cards are actually properly paired with each other.

The several pairs of cards are positioned in a card storage magazine 200, which is best seen in FIGS. 6 and 7. This magazine is connected by a card conveyor and separator 250 to a slide projection apparatus 300, hereinafter referred to as a projector, and with a magnetic recording and reproducing apparatus 400, hereinafter referred to as a scanner. The slide 40 on the A-card is projected, by projector 300, on the frosted glass panel 11 of the machine 10 shown in FIG. 1. The recording panels 44 and 46 on the B-card are processed by the scanner. This latter scans the information applied on recording panel 44, making it audible through the medium of loudspeaker 27.

The card storage magazine, card conveyor and separator, projector, and magnetic recording and reproducing device are neither shown nor described in detail since they form no part of the present invention and may constitute conventional elements known per se. However, it should be mentioned that the scanner is provided with a track finder for the recording panel 46, this track finder being controlled by keys 13, so that the tracks 45 of the B-card can be selected individually in accordance with the particular key 13 which is operated.

Scanner 400 is operatively connected to a shift register 501 by means of a line connection 500, shift register 501 being illustrated in FIG. 7. Shift register 501 is connected by a line connection 502 with keyboard 22 shown in FIG. 1, and by a line connection 503 to a card finder 650 and to lamp array 23 located above keyboard 22. Through the medium of line connection 651, card finder 650 is connected with start key 14. Card finder 650 is also connected, by means of a line connection 652, with card magazine 200. The card finder is not shown or described in detail because it comprises conventional and well known parts.

Figure 4:
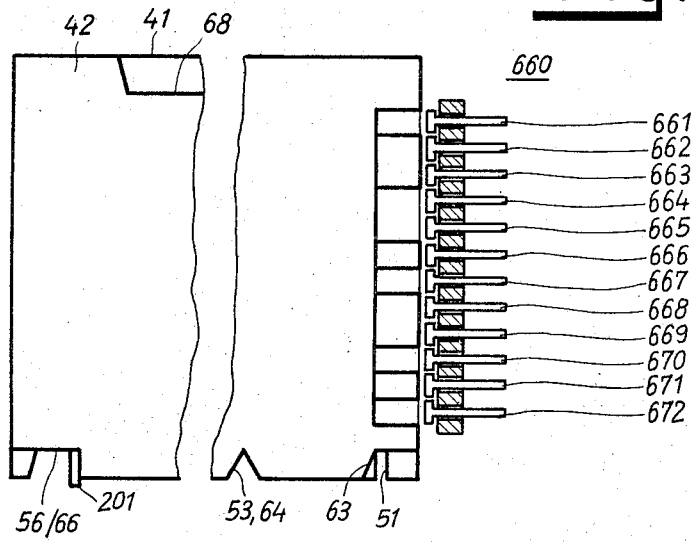
FIG. 4 is a somewhat schematic view of a selector for the information units, in the rest position.
Figure 5:
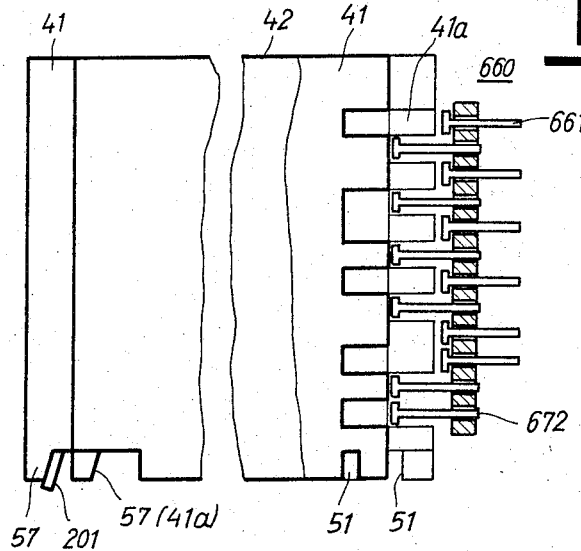
FIG. 5 is a view, similar to FIG. 4, but showing the selector operated.

It should be mentioned that selector 660, for scanning the notched edge 50 of the individual pairs of cards, preferably is positioned within card finder 50, and it has twelve feelers 661–672 as best seen in FIG. 4, these corresponding to the selected 12-number code. As is customary in the selection of notched cards, the feelers leave only the A-card to be selected in rest position, with all other A-cards shifted, as best seen in FIG. 5.

The method of operation of the apparatus will now be described. The teaching program to be presented, represented by a stack of card pairs with each pair consisting of an A-card and a B-card, is transferred into card storage magazine 200 through opening 20 of teaching machine 10. The teaching machine is activated by operating the key 16. Then the identifying number of the first desired pair of cards, for example, when offering a complete program, the identifying number "000000111111" of the first card, is now set by means of keyboard 22, and start key 14 is pressed.

Through line connection 651, a starting impulse reaches keyboard 22 and card finder 650. The identifying number set by means of keyboard 22 is transferred to shift register 501 and applied through line connection 503 to card finder 650, and is then indicated by lamp array 23. Through suitable means, such as relays or other suitable devices, six of the feelers 661–672 shown in FIGS. 4 and 5 are shifted in card finder 650. The six feelers shifted correspond to the set identifying number. All A-cards which do not correspond to the identifying number set in keyboard 22 are thus moved to the left, as shown in FIG. 5. Only the A-card 41a, corresponding to the identifying number set in keyboard 22, remains in the position as represented in FIG. 5. In FIG. 5, the first B-card is only partly represented in order to show the A-card behind it.

A bar 201 in card finder 650 extends transversely of the card stack. During the locating process, this bar bears on the edges 65 of the recesses 66 of all the B-cards, thus preventing displacement of the B-cards. A feeler 203, which moves along the now coinciding notches 53a and 53b of the individual pairs of cards, determines the point where the selected A-card is found. This selected A-card 41a covers the longitudinal groove formed by the notches 53a and 53b, due to the shifting of all of the other A-cards. After the position of the selected A-card has been determined, a pick-up 205, moving in coordination with feeler 203, engages the notch 51 of the selected A-card 41a. Selector 660, having the feelers 661–672, is then moved away from the card stack into an inoperative position.

At the same time, bar 201, which prevents displacement of the B-cards during the selecting process, is brought into the position, with respect to the A-cards, represented in FIG. 5. This is accomplished by moving bar 201 downwardly and, at the same time, rearwardly, so that projection 57 of recess 56 of the selected A-card 41a is positioned in advance of bar 201. The selected A-card can now be removed from the stack by pick-up 205, engaged in notch 51, moving in the direction of the arrow 61 of FIG. 2. During removal of the selected A-card 41a, the associated B-card is also removed from the card stack. This is effected by reinforcement 47 of the A-card bearing on follower 60 of the associated B-card. However, all of the other A-cards of the stack are retained in the stack by means of bar 201, and thus retain the associated B-cards in the stack through the cooperating followers 47 and 60.

The pair of selected cards removed from the stack is engaged by the card conveyor and separator 250, and the two cards are separated by pick-ups (not shown) which can individually engage both the A-card and the B-card due to the staggered arrangement of the recesses 54, 58 and 66, 68, respectively. The A-card is fed to projector 300 and the B-card to scanner 400. After corresponding actuation of other instrumentalities, which are not represented in the drawings, slide 40 on the selected A-card is projected onto the frosted glass panel 11, and the information provided in the recording panel 44 of the B-card is made audible through the loudspeaker 37. This latter can, of course, be designed as a headphone if desired.

As mentioned above, answers are presented to the student or other user of the machine, for selection, along with the information to be learned. These answers are projected in the panel 18 of the frosted glass, next to the answering keys 13. When the student decides on one of the answers, he presses the answering key next to it, for example, the key 13f shown in FIG. 6. In correspondence with the particular answering key, such as the key 13f, which has been pressed, the B-card in scanner 400 is now moved relative to the scanning device in such a manner that the track 45f of the recording panel 46, associated key 13f, can be scanned. As described above, the first digit K of this track represents the information whether the correct answer or the wrong answer has been selected; i.e. "right" or "wrong." If the answer associated with the key 13f is the correct answer, indicator lamp 30, which may be green, for example, lights up over a line 440 and a switch 441. However, if the answer associated with key 13f is the wrong answer, indicator lamp 31, which may be red, for example, lights up.

Subsequently, the identifying number of the next pair of cards to be offered, which is recorded in the track 45f selected by the answering key 13f, is scanned and transferred to shift register 501 over line connection 500. The selection of the next pair of cards to be offered is thus dependent upon whether or not the correct answer has been given. The final impulse resulting from the scanning effects the ejection of the A-cards and B-cards from the projector and from the scanner, respectively, the recombination of the A-card and the B-card into a pair, and the transfer of the pair of cards to card storage magazine 200.

The final impulse of card storage magazine 200 effects transfer of the new identifying number, stored in shift register 501, to card finder 650. This now selects, in the manner already described, the next pair of cards from the card storage magazine, and the selected pair of cards is transferred, separated into an A-card and a B-card by card conveyor and separator 250, and positioned at projector 300 and scanner 400, respectively. The information thereon is then presented to the student or other user of the apparatus.

The selection of a new pair of cards and the return of the old pair is then effected in the manner already described. Each teaching program can be stopped by operating "stop" key 15. A line connection 253 connects this "stop" key to control the card conveyor and separator 250, and effects the transfer of the pair of cards then being presented to the card storage magazine. It will be understood that individual cards and films also can be used as recording means without departing from the underlying concept of the invention, which is that of automatic determination of the next recorded information to be presented.

While a specific embodiment of the invention has been shown and described in detail to illustrate the application of the principles of the invention, it will be understood that the invention may be embodied otherwise without departing from such principles.

What is claimed is:

1. Apparatus for the visible and audible presentation of information comprising, in combination, plural separate information units each comprising a pair of cards arranged in surface-to-surface juxtaposition and formed for conjoint edgewise displacement as a unit; one of said cards having information thereon in the form of a projection slide for optical projection of such information; the other of said cards having information magnetically recorded thereon for audible presentation of its information; each unit having respective first scannable features identifying the respective unit, and respective second scannable features determining the next information unit to be presented; presentation means operable to scan the information on a selected unit positioned thereat and to present the information thereon visibly and audibly; unit selector means cooperable with said first scannable features to select a unit for positioning at said presentation means; control means for said selector means controlled by said second scannable features; and selectively operable manual means cooperable with said second scannable features to predetermine the control of said control means by said second scannable features.

2. Apparatus for visible and audible presentation of information, as claimed in claim 1; said first scannable features comprising marginal notch means formed on an edge of one of said cards for cooperation with said unit selector means.

3. Apparatus for the visible and audible presentation of information comprising, in combination, plural separate information units, each comprising first and second cards arranged in surface-to-surface juxtaposition and formed for conjoint selection as a unit; said first card having optically scannable information thereon; said second card having a first panel containing magnetically scannable information therein; each unit having respective first scannable features identifying the respective unit and corresponding to an identifying number of a respective unit; said second card having a second panel having plural respective magnetically recorded sound tracks thereon each containing information as to the identifying number of a respective one of said information units; presentation means operable to scan the information on a selected unit positioned thereat and to present the information thereon visibly and audibly; unit selector means cooperable with said first scannable features to select a unit for positioning at said presentation means; control means for said selector means controlled by said respective sound tracks in said second panel of said second card of each unit to condition said selector means to select a succeeding unit for positioning at said presentation means in accordance with the particular sound track controlling said control means; and plural selectively operable manual means each operatively associated with a respective sound track in said second panel of said second card of a unit positioned at said presentation means to select the respective sound track for controlling said control means.

4. Apparatus for the visible and audible presentation of information, as claimed in claim 3; said selectively operable manual means comprising a series of manually operable means each located adjacent a respective presented answer; each sound track in said second panel of said second card of each unit containing the information "right" and "wrong"; whereby the next unit to be positioned at said presentation means is determined by the particular answer selected by the user of the apparatus.

5. Apparatus for the visible and audible presentation of information comprising, in combination, plural separate information units each comprising first and second cards arranged in surface-to-surface juxtaposition, each first card having scannable information thereon arranged for visual presentation, and each second card having magnetically recorded scannable information thereon for audible presentation; said cards being substantially congruent and rectangular and each having a shorter edge and a longer edge; said first card having notch means along its shorter edge identifying the information content of the unit; one of said cards having scannable features determining the next information unit to be presented; presentation means operable to scan the information on a selected unit positioned thereat and to present visually the information on the first card and to present audibly the information on the second card; unit selector means cooperable with said notch means to select a unit for positioning at said presentation means; control means for said selector means controlled by said second scannable features; selectively operable manual means cooperable with said scannable features to predetermine the control of said control means by said scannable features; and recess means along corresponding longer sides of the two cards of each unit, and staggered with respect to the respective cards, for separation of the two cards of each unit; when positioned at said presentation means, for separate presentation of the visible and audible information; said cards being formed for conjoint selection as a unit by said unit selector means.

6. Apparatus for the visible and audible presentation of information, as claimed in claim 5; one of said first and second cards having a notch, in a longer edge and adjacent said notch means, for engagement by an element of said unit selector means to displace both cards as a unit.

7. Apparatus for the visible and audible presentation of information comprising, in combination, plural separate information units, each comprising first and second cards arranged in surface-to-surface juxtaposition with each other, the two cards being substantially rectangular and congruent and each having a shorter edge and a longer edge; a respective series of identifying notches, separated by tabs, formed along a shorter edge of each first card, identifying the information content of the unit and corresponding to an identifying number of the unit; a continuous notch formed along the corresponding edge of the other card of each unit, having a depth equal to that of said identifying notches, and an overall length corresponding to the overall length of said series of identifying notches; interlocking means on the facing surfaces of said first and second cards providing for relative displacement thereof, parallel to their longer edges, through a distance equal to the depth of said continuous notch and said series of identifying notches; the tabs defining said series of notches having, on one surface thereof, a characteristic color; the corresponding surface of the second card having areas, extending inwardly from the inner edge of the continuous notch thereof, each aligned with a respective one of said identifying notches in the first card and each being dimensionally congruent with the aligned identifying notch, each of said areas having said characteristic color; whereby, when said cards are relatively displaced longitudinally, the correct pairing of a pair of first and second cards can be determined if there is a solid band of said characteristic color appearing through said notches and over said tabs; each unit having respective scannable features determining the next information to be presented; presentation means operable to scan the information on the cards of a selected unit positioned thereat and to present the information on the cards; unit selector means cooperable with said series of identifying notches to select a unit for positioning at said presentation means; control means for said selector controlled by said scannable features; and selectively operable manual means cooperable with said scannable features to predetermine the control of said control means by said scannable features.

8. Apparatus for the visible and audible presentation of information comprising, in combination, plural separate information units each comprising first and second cards arranged in surface-to-surface juxtaposition with each other, said first and second cards being substantially rectangular and congruent, and each having a shorter edge and a longer edge; respective series of identifying notches formed along corresponding shorter edges of said first cards to identify the information content of a unit, and each respective series of identifying notches corresponding to an identifying number of the respective unit; the corresponding shorter edge of each second card having a continuous notch extending therealong having a depth equal to that of said identifying notches and a length equal to the length of said series of said identifying notches; interlocking means on the juxtaposed surfaces of said first and second cards providing for relative longitudinal displacement thereof through a distance equal to the depth of said identifying notches and said continuous notch; said first cards having first notches at corresponding locations in a respective longer edge and spaced a first predetermined distance from the notched shorter edge; said second cards having second notches corresponding locations in a corresponding longer edge thereof and spaced from the notched edge by a second predetermined distance differing from said first predetermined distance by the depth of said identifying notches and said continuous notch; whereby when said first cards are displaced relative to said second cards through a distance equal to the depth of said identifying notches and said continuous notch, all of said first and second notches in a stack of said units will be aligned to form a groove extending longitudinally of the stack; each unit having scannable features determining the next information unit to be presented; presentation means operable to scan the information on a selected unit positioned thereat and to present the information thereon; unit selector means cooperable with said identifying notches to select a unit for positioning at said presentation means; control means for said selector means controlled by said scannable features; and selectively operable manual means cooperable with said scannable features to predetermine the control of said control means by said scannable features.

9. Apparatus for the visible and audible presentation of information, as claimed in claim 8; said unit selector means, when operated, displacing all of said first cards, in a stack, relative to said second cards, except a selected first card; each first card having means, adjacent its notched shorter edge, engageable by a unit of said selector means for extraction of a selected first card and its associated second card from the stack; each first card having means on a longer edge and remote from its notched shorter edge engageable by a retaining element in said selector means, when the first card has been so displaced by said selector means, to restrain the displaced first cards, and their associated second cards, from extraction from the stack.

10. Apparatus for the visible and audible presentation of information comprising, in combination, plural separate information units, in the form of card means each having respective identification features thereon corresponding to respective said card means in stacked relation; an automatic finder operable to extract a respective information unit from said storage magazine in accordance with the identifying number of the respective information unit; presentation means operable to scan the information on a selected information unit positioned thereat and to present the information thereon; conveyor means for transferring the extracted information unit from said storage magazine to said presentation means; a shift register controlling operation of said automatic finder; each information unit having recorded thereon the identifying number of the next information unit to be selected; and scanning means cooperable with the recorded identifying number on an information unit then being presented to enter such identifying number into said shift register; each card means comprising a first card and a second card arranged in surface-to-surface juxtaposition, said cards being substantially rectangular and congruent; each first card having slide means thereon recording information for visual presentation, and each second card having information magnetically recorded thereon for audible presentation; said presentation means comprising a projector, cooperable with a selected first card for presentation of the visual information, and a magnetic sound transducer cooperable with a second card for presentation of the audible information.

11. Apparatus for the visible and audible presentation of information, as claimed in claim 10, said conveyor means including card separating means; each of said first and second cards being provided with a formation, and the two formations being relatively spaced, for selective cooperation with said separating means for delivery of the selected first card to said projector and delivery of the selected second card to said magnetic sound transducer.

12. Apparatus for the visible and audible presentation of information comprising, in combination, a housing having a substantially rectangular translucent panel for projection of visual information thereon; a column of "answer keys" arranged along a shorter side of said panel; presentation means in said housing including a projector arranged to project a slide on said screen and a magnetic recording and reproducing device including a sound transducer; a storage magazine in said housing; plural separate information units arranged to be stacked in said storage magazine; each information unit including a first card and a second card arranged in surface-to-surface juxtaposition and formed for conjoint stacking and extraction from said magazine as a unit; each first card having a substantially rectangular slide having information recorded thereon for visual presentation, the information recorded on each side including a set of answers arranged in a column adjacent a shorter end of said slide whereby, when said slide is projected, said column of answers will appear alongside said column of "answer keys" with each answer being laterally aligned with a respective "answer key"; each second card having magnetically recorded thereon information for audible presentation; each information unit having respective identifying formations thereon each corresponding to a respective identifying number of the respective unit; an automatic finder in said housing operable to extract a selected information unit from said storage magazine in accordance with the identifying formations thereon; a conveyor effective to convey the selected and extracted unit to said presentation means and including means cooperable with relatively displaced second formations on said first and second cards to separate said cards for positioning of said first card in operative association with said projector and said second card in operative association with said magnetic recording and reproducing device; a shift register in said housing in controlling relation with said automatic finder for receiving the identifying number of the next information unit to be presented; each second card including a panel having recorded thereon plural sound tracks each corresponding to a respective "answer key," each sound track having recorded thereon "right" and "wrong" information and the identifying number of a respective other information unit; means operable, responsive to the user operating a selected "answer key," to select the corresponding one of said sound tracks; and means operable to scan the selected sound track to register the corresponding information unit identifying number in said shift register.

13. Apparatus for the visible and audible presentation of information, as claimed in claim 12, including a keyboard on said housing connected to said shift register for setting into said shift register an identifying number determining the information unit to be selected by said automatic finder.

14. Apparatus for the visible and audible presentation of information, as claimed in claim 13, including a lamp array positioned adjacent said keyboard and having a number of lamps corresponding to the number of keys in said keyboard, said lamp array indicating the identifying number set by said keyboard; and means connecting said lamp array to said scanning means to indicate the identifying number recorded in said selected sound track.

15. Apparatus for the visible and audible presentation of information, as claimed in claim 14, further comprising means included in said automatic finder cooperable with the cards in said storage magazine to retain, in said storage magazine, all non-selected information units while the selected information unit is extracted from said storage magazine.

16. An apparatus for the visible and audible presentation of information units in which the information is arranged on recording carriers having scannable features at their edges, the recording carriers carrying information to be presented and, in cooperation with the user of the apparatus operating a keyboard of the apparatus, effecting selection of the information unit to be presented next; the improvement in which the information units comprise a pair of separate cards having interengageable followers limiting relative movements of the two cards of each pair; one card of each pair carrying the visible information and the other card of each pair carrying the audible information; only one card of each pair having the scannable features in the form of a notched edge; a selector cooperable with the scannable features; a keyboard in controlling relation with said selector to determine the information unit to be selected; a shift register connected to said keyboard for storage of information set on said keyboard; said selector comprising a component of a card finder operable to extract the selected information-carrying pair of cards from a card storage containing all of the cards; a card-separating and card-transporting device transporting the selected pair of cards to information presentation devices in which the two cards of each pair are separately scanned in coordination with each other, said card-separating and card-transporting device rejoining the two pair of cards to each other and returning the joined pair to the card storage device; the card of each pair not provided with the scannable features on a notched edge carrying information determining the selection of the information unit next to be presented, and a presentation device associated with the last-mentioned cards including a switching device connected to said shift register and cooperable with said information determining the selection of the information unit to be next presented to effect the selection and transport of the succeeding pair of cards.

17. Apparatus for the visible and audible presentation of information, as claimed in claim 16, including a scanning means connected to said shift register to set an identifying number determining an information carrier.

18. Apparatus for the visible and audible presentation of information, as claimed in claim 16, including a lamp array indicating the identifying number of a selected information unit.

19. Apparatus for the visible and audible presentation of information, as claimed in claim 16, in which said card finder includes a switching means holding all non-selected information carriers in said card storage means.

20. Apparatus for the visible and audible presentation of information, as claimed in claim 16, in which one card of each pair carries information in the form of a projectable slide, and the other card of each pair carries information in the form of a magnetic recording.

21. Apparatus for the visible and audible presentation of information, as claimed in claim 20, in which each card of each pair is formed with a recess in a longitudinal side thereof, the longitudinal sides of the two cards corresponding to each other, and the two recesses being displaced relative to each other and being engageable by means serving to extract the cards from said card storage.

22. Apparatus for the visible and audible presentation of information, as claimed in claim 20, in which one card of each pair is formed with a notch adjacent the notched edge thereof, and cooperable with means for removing the pair of cards from the card storage means.

23. Apparatus for the visible and audible presentation of information, as claimed in claim 20, in which the two cards of each pair have correspondingly arranged notches in an edge thereof, the notches being so positioned that all of the non-selected cards in said card storage conjointly define a groove extending along the stack of cards, said groove being formed by displacement of all of the non-selected cards.

24. Apparatus for the visible and audible presentation of information, as claimed in claim 23, in which one card of each pair of cards is formed with a notch in a longitudinal edge thereof adjacent the side edge thereof opposite the notched edge thereof, said last-named notch being engageable with means for displacing the non-selected cards laterally of the stack.

References Cited
UNITED STATES PATENTS 3,141,243    7/1964    Chapman et al. _____ 35—9

OTHER REFERENCES

Crowder, N. A., and Martin, G. C.: Adventures in Algebra (Tutor Text), N.Y., Doubleday and Co., Inc., 1960, pp. 2, 3. (Copy in Art Unit 336.)

EUGENE R. CAPOZIO, *Primary Examiner.*

W. W. NELSEN, *Assistant Examiner.*